Figure 1:
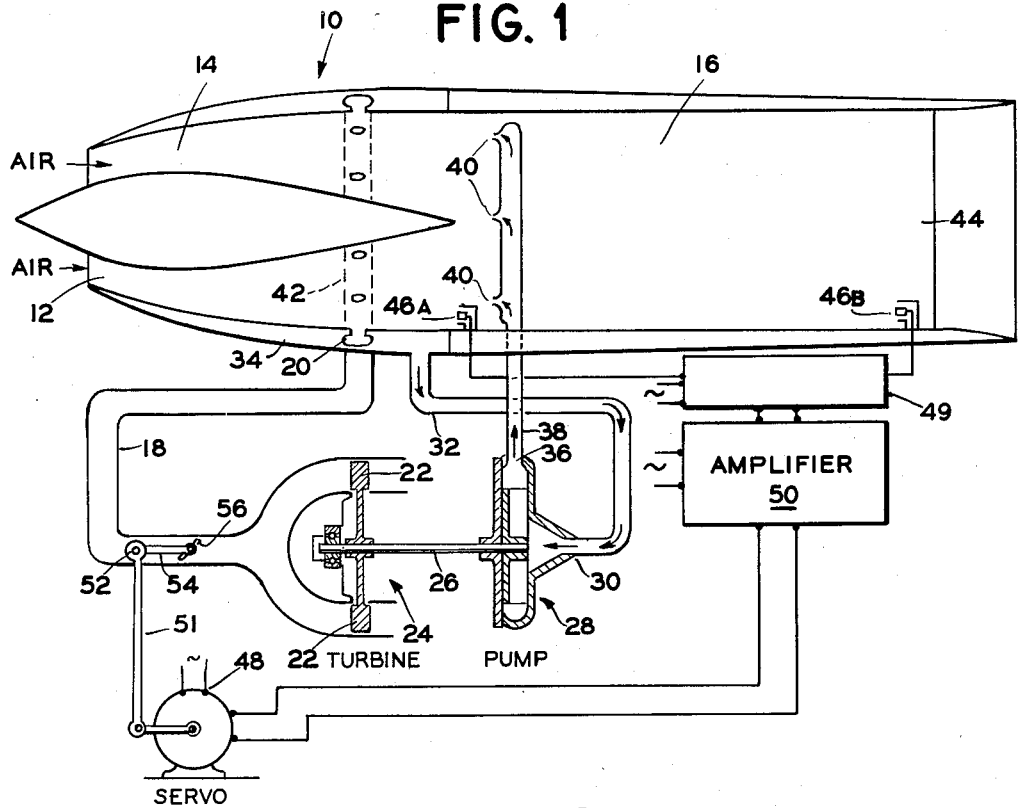

Feb. 28, 1956  W. D. TEAGUE, JR., ET AL  2,736,167
AIR FUEL RATIO CONTROL FOR RAM JETS
Filed Feb. 7, 1950

INVENTORS
WALTER D. TEAGUE JR.
PASQUALE A. DE PADOVA
BY Michael D. Borsella
ATTORNEY

United States Patent Office 2,736,167
Patented Feb. 28, 1956

2,736,167

AIR FUEL RATIO CONTROL FOR RAM JETS

Walter D. Teague, Jr., Alpine, and Pasquale A. De Padova, Newark, N. J., assignors to Bendix Aviation Corporation, Teterboro, N. J., a corporation of Delaware Application February 7, 1950, Serial No. 142,808

11 Claims. (Cl. 60—39.28)

The present invention relates to means for maintaining a substantially constant air fuel ratio in a ram jet engine.

A ram jet engine cannot start operating by itself. A missile powered by a ram jet engine needs to be launched from a suitable apparatus or other aircraft, and once the ram jet is started it will sustain itself in flight by generating its own power. A power plant of this character is designed for operation at a predetermined altitude, and it is, therefore, desirable to maintain the air fuel ratio most advantageous for that altitude substantially constant.

A ram jet of the type contemplated to control herein generally involves at least one combustion chamber, a centrifugal pump, a bank of injectors, and a turbine all housed within a streamlined tubular casing. Air enters the casing at an inlet of a suitable flow passage and is compressed by a diffuser type pressure recovery. A small portion of the compressed air then passes on to drive a turbine which in turn drives a centrifugal fuel pump which pumps fuel into the combustion chamber. The main flow of the compressed air is then mixed with the fuel atomized by the nozzles of the fuel injector. The air and fuel mixture is then ignited by some suitable means and burns steadily thereafter. The hot gases or modified fluid comprises the products of combustion and are then directed generally into the tail pipe and then discharged at high velocity to the atmosphere so that the energy therefrom is used to propel the craft.

One object of the present invention, therefore, is to provide an automatic system for controlling the air fuel ratio in a ram jet powered aircraft.

Another object of the invention is to solve the problem of the above indicated character and to do so in a novel and effective manner.

Still another object of the invention is to control the air fuel ratio by means of measuring inlet and outlet combustion chamber stagnation temperatures.

The above and other objects and features of the invention will appear more fully hereinafter from a consideration of the following description taken in connection with the accompanying drawing wherein one embodiment of the invention is illustrated by way of example, It is to be expressly understood, however, that the drawing is for the purposes of illustration only and is not to be construed as defining the limits of the invention.

Referring to the drawing wherein like reference characters designate like parts, Figure 1 is a schematic drawing of a ram jet engine showing the various components of the air fuel ratio regulating system attached thereto.

Figure 2:
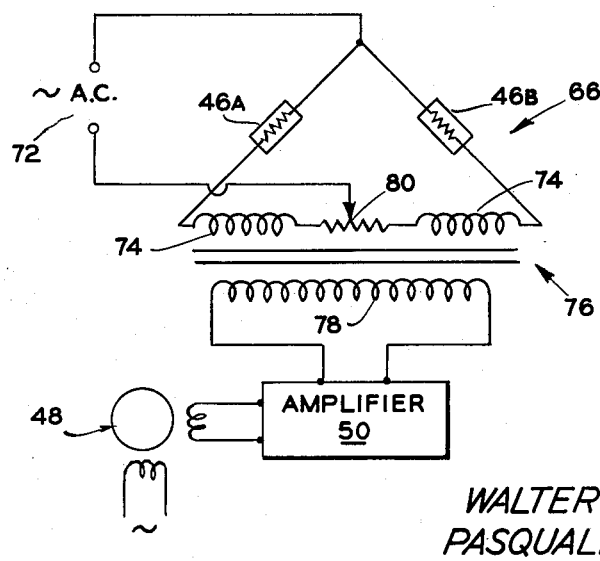

Figure 2 is a wiring diagram of one embodiment of the regulatory means of the invention.

Referring now to the drawing, a ram jet engine generally designated by the numeral 10 comprises an inlet 12 leading past the venturi section 14 into a combustion chamber 16. A duct 18, by means of an aperture 20, leads a portion of the incoming air to the buckets 22 of a turbine 24. A shaft 26 connects the turbine to the driving shaft of a centrifugal pump 28. The inlet 30 of the pump 28 connects to line 32 which leads to a fuel reservoir 34 and the outlet 36 of the pump 26 connects to line 38 which leads to the fuel injector 40 in the combustion chamber 16.

Protruding within the combustion chamber 16 at the inlet 42 and at the outlet 44 thereof are temperature probes 46A and 46B, respectively, adapted to measure the temperature of high velocity and high temperature gases. The high temperature probes 46A and 46B are of the type more specifically disclosed in copending application Serial No. 63,381, filed December 3, 1948, and now U. S. Patent No. 2,579,271, granted December 18, 1951, on Temperature Probe in the name of William R. Polye and assigned to Bendix Aviation Corporation, the assignee of the present application.

The temperature probe 46A is disposed so as to measure the inlet 42 temperature, while the temperature probe 46B measures the outlet 44 temperature of the combustion chamber 16. The probes 46A and 46B are connected through a suitable regulating circuit 49 to an amplifier 50 of a type well known in the art, the output from which controls a motor 48. The electric motor 48 is of a type commonly known in the art, such as a two phase motor, adapted to exert either a pushing or pulling force upon a rod 51 which is in turn attached as at 52 to a lever 54 which operates a butterfly type valve 56 in the duct 18. The butterfly valve 56 controls the flow of air through the duct 18 to the turbine 24 and consequently the speed thereof.

Referring now to Figure 2 wherein one embodiment of a number of regulating circuits which will readily occur to those skilled in the art is illustrated by way of example, the temperature probes 46A and 46B are placed in opposite arms of the bridge 66, and 72 is a source of constant frequency alternating current connected across the bridge. Primary 74 of a transformer 76 forms part of the bridge circuit. The secondary 78 of the transformer 76 is connected to the amplifier 50 which in turn feeds power of a phase determined by the balance of the bridge circuit to the motor 48 to cause the motor to rotate in a direction to regulate the butterfly valve 56 and thereby the speed of the turbine 24. A balancing potentiometer 80 serves to initially balance the bridge 66 at a predetermined differential between inlet and outlet temperature as sensed by the probes 46A and 46B, respectively. The bridge thereafter will be unbalanced by the differential of the resistance across the probes 46A and 46B at the inlet and outlet of the combustion chamber 16.

Having thus described the invention, it will now be apparent to those skilled in the art that after the ram jet 10 is launched, and sustains itself by its own power, air will flow into the inlet opening 12 through the venturi section 14 and into the combustion chamber 16. Some of the air will pass through duct 18 and be directed against the buckets 22 of the turbine 24 to drive the turbine and, therefore, by means of shaft 26, drive the centrifugal fuel pump 28.

Thereupon fuel is drawn from the reservoir 34 to the pump 28 and passed therefrom through the conduit 38 to the injectors 40 where it is atomized and mixed with the incoming air. The air-fuel mixture thus resulting is then ignited, and the resulting products of combustion and waste gases are directed towards the tail pipe 44 and discharged therefrom into the atmosphere with great force thereby supplying the thrust necessary to propel the craft.

The ignition of the air fuel mixture may be accomplished by any of a number of suitable means, including the means disclosed in copending application Serial No. 91,337, filed May 4, 1949, on Rocket Ignitor for Jet Engines in the name of Walter D. Teague, Jr., and assigned to Bendix Aviation Corporation and now abandoned.

In a system of the nature heretofore described, it will readily be seen that the air-fuel ratio will be affected by such factors as the combustion chamber inlet and outlet temperatures, the efficiency of the chamber and the specific heat therein and the heating value of the fuel burned. The regulating means herein contemplated therefore are based on the principle that where:

A is the quantity of air.
F is the quantity of fuel.
$h$ is the heating value of the fuel.
E is the efficiency of the combustion chamber.
$c$ is the average specific heat.
$T_1$ is the combustion chamber inlet temperature.
$T_2$ is the combustion chamber outlet temperature.

$$c(T_2-T_1)(F+A)=(h)(E)(F)$$

from which by algebraic re-arrangement the air fuel ratio $$\frac{A}{F}=\frac{Eh}{c}\frac{1}{(T_2-T_1)}-1$$

It will be noted that since E, $h$, and $c$ are substantially constant $(T_2-T_1)$ is the only variable expression in the equation, and, therefore, the air fuel ratio $$\frac{A}{F}$$

will be maintained substantially constant if $(T_2-T_1)$ is maintained constant.

Referring to the circuit illustrated in Figure 2, it will be apparent that the differential of the resistances of the temperature probes 46A and 46B is directly proportional to the expression $(T_2-T_1)$, and will unbalance the bridge 66 as $(T_2-T_1)$ changes in value. Therefore, a change in the resistances of the probes 46A and 46B due to a change in the difference between the temperature of the combustion chamber gases at the inlet and at the outlet of the chamber will unbalance the bridge 66 and will change the value of the power transmitted from the primary 74 to the secondary 78 and to the amplifier 50. This in turn will govern the speed and direction of rotation of the motor 24, the ultimate effect being proportional to the change in the resistances of the probes 46A and 46B caused by the change in the temperature of the gases at the points under measurement so that an increase in combustion chamber differential temperature will cause less quantity of fuel to be supplied to the chamber and a decrease in differential temperature will cause a greater quantity of fuel to be supplied to the combustion chamber. The motor 48 actuates the butterfly valve 56, which will, therefore, regulate the amount of driving air reaching the turbine 24, and, therefore, the speed of the fuel pump 28 to thereby regulate the quantity of fuel reaching the injectors 40.

There are thus provided regulating means for maintaining a constant air-fuel ratio in a ram jet engine by measuring the inlet and outlet temperatures of the gases in the combustion chamber of the engine, said means being accurate and reliable, and yet extremely simple and economical.

Although only one embodiment and one application of the invention has been illustrated and described, other changes and modifications in the form and relative arrangement of parts which will be apparent to those skilled in the art may be made without departing from the spirit and scope of the invention.

What is claimed is:

1. A system for controlling the air-fuel ratio in a ram jet engine, said engine including a combustion chamber having an air inlet and an exhaust gas outlet, said system comprising a turbine to be driven by ram air from said engine, valve means for controlling the flow of air to said turbine, a centrifugal fuel pump to be driven by said turbine, a bank of fuel injectors for said combustion chamber to be supplied with fuel by said pump, a temperature probe protruding into said combustion chamber at the inlet, a second temperature probe protruding into said combustion chamber at the outlet, said probes each including a resistance element forming one leg of a balanced bridge, said bridge having an input to be operably connected to a source of constant frequency alternating current and output connections, an amplifier operably connected at its input to the output connections of said bridge, and a motor controlled by said amplifier and operated upon an unbalance of said bridge in a direction to effect said valve means to regulate the speed of said centrifugal pump and thereby the fuel supplied to said combustion chamber by said pump so as to maintain a predetermined differential between the inlet and outlet temperatures.

2. A system for controlling the air-fuel ratio in a jet engine, said engine including a combustion chamber having an air inlet and an exhaust gas outlet, said system comprising a turbine to be driven by ram air from said engine, valve means for controlling the flow of the air to said turbine and thereby the speed of said turbine, a fuel pump to be driven by said turbine, a bank of fuel injectors to be supplied with fuel by said pump, a temperature probe protruding in said combustion chamber inlet, a second temperature probe protruding in said combustion chamber outlet, the electrical resistance of said temperature probes varying with the temperatures at said inlet and outlet, said probes being operatively connected in an electric circuit, a servomotor controlled by said circuit, said servomotor actuating said valve in a direction to regulate the speed of said turbine and thereby said fuel pump so as to maintain a predetermined differential between the combustion chamber temperatures at said probes.

3. A system for controlling the air-fuel ratio in an aircraft engine, said engine including a combustion chamber, said combustion chamber having an exhaust gas outlet and an air inlet; said system comprising a pump for supplying fuel to said chamber, a temperature probe at the inlet of said chamber, a second temperature probe at the outlet of said chamber, said probes operatively connected in a bridge circuit to balance the same at a predetermined differential between the temperatures at the inlet and outlet of said chamber, a motor operable upon the unbalance of said bridge by said probes upon variance in said differential temperature, a turbine drivingly connected to said pump, means controlled by said motor for regulating the driven speed of said turbine and thereby the speed of the fuel pump and the quantity of fuel supplied to said combustion chamber upon the unbalance of said bridge by said temperature probes.

4. A system for controlling the air-fuel ratio in a ram jet engine, said engine including a combustion chamber having an air inlet and an exhaust gas outlet; said system comprising an air driven turbine, a fuel pump driven by said turbine, means for controlling the speed of said turbine, an amplifier electrically energizing said control means, a temperature probe at the inlet of said chamber, a second temperature probe at the outlet of said chamber, means operatively connecting said first and second probes through said amplifier to said control means so as to affect the speed of said turbine and pump to regulate the quantity of fuel pumped into said combustion chamber in accordance with said inlet and outlet temperature.

5. A control mechanism for controlling the air-fuel ratio in a ram jet engine; said engine including a combustion chamber having an air inlet and exhaust gas outlet; said control mechanism comprising a high temperature measuring means at the inlet and outlet of said chamber, a servomotor means, an amplifier operatively connecting said temperature measuring means to said servomotor means, a turbine and fuel pump controlled by said servomotor means, the speed of said turbine and pump being regulated by said measuring means.

6. A control mechanism for controlling the air-fuel ratio in a ram jet engine, said engine including a combustion chamber having an air intake and an exhaust gas outlet; said control mechanism comprising a turbine to be driven by air pressure from said intake, a pump, means drivingly connecting said turbine to said pump, said pump to supply fuel to said combustion chamber to mix with air from said intake, variable resistance temperature measuring means at the inlet and outlet of said combustion chamber, transformer means including a primary and a secondary winding, the primary winding connected with said variable resistance means in a balanced bridge, a source of constant frequency alternating current connected to the input of said bridge, said secondary winding providing the output of said bridge, an amplifier connected in the output of said bridge, and servo means controlled by said amplifier to regulate the speed of said turbine and pump to maintain a predetermined constant air fuel ratio.

7. A control mechanism for controlling the air-fuel ratio in a ram jet engine having a combustion chamber including a ram air inlet conduit and an exhaust gas outlet conduit; said control mechanism comprising temperature measuring means at the inlet and outlet conduits of said chamber, pump means for supplying fuel to said combustion chamber, regulating means for said fuel supply means including a turbine driven by fluid pressure from one of said conduits, means drivingly connecting said turbine to said pump means, means for regulating the driven speed of such pump means, said last mentioned means being responsive to the temperature measuring means to maintain a predetermined differential between the inlet and outlet combustion chamber temperatures.

8. For use in controlling the air fuel ratio in a ram jet engine having a combustion chamber including a ram air inlet conduit and an exhaust gas outlet conduit, and pump means for supplying fuel to the combustion chamber; the combination comprising a first temperature sensing device at the inlet conduit to said chamber, a second temperature sensing device at the outlet conduit of said chamber, a turbine driven by fluid pressure from one of said conduits, means drivingly connecting said turbine to said pump means, means for infinitely varying the driven speed of said pump means and thereby the quantity of fuel to said combustion chamber, and said last-mentioned means being jointly affected by said first and second devices so as to maintain a predetermined difference between the temperatures at said inlet and outlet.

9. In a system for controlling the air fuel ratio of an aircraft engine including a combustion chamber having an exhaust gas outlet conduit and a ram air inlet conduit; the improvement comprising temperature sensing means at the inlet and outlet conduits of said chamber, a variable speed pump for supplying fuel to said combustion chamber, a turbine driven by fluid pressure from one of said conduits, means drivingly connecting said turbine to said pump, means for controlling the supply of the fluid pressure to said turbine and thereby the driven speed of said pump, and means operatively connecting said control means to the temperature sensing means to regulate the driven speed of said pump and thereby the quantity of fuel pumped into said combustion chamber in accordance with said inlet and outlet temperatures.

10. A control system for a ram jet engine having a ram air inlet and an exhaust gas outlet, said system comprising means to supply fuel to said engine in varying quantity, a member movable to control the quantity of the fuel supplied to said engine, means providing a first signal which is a measure of the temperature of the air inlet to said engine, means providing a second signal which is a measure of the temperature of the exhaust outlet gas from said engine, and motor means operable in response to changes in said first and second signals for moving said member so as to regulate the quantity of the fuel supplied to said engine in accordance with said air inlet and said exhaust gas outlet temperatures.

11. A control system for a ram jet engine having a ram air inlet and an exhaust gas outlet, said system comprising a fluid turbine, means for supplying motive fluid for driving said turbine, a fuel pump arranged to be driven by said turbine, a member movable to vary the speed of said turbine so as to vary the rate of fuel flow to said engine, means providing a first signal which is a measure of the temperature of the air inlet to said engine, means providing a second signal which is a measure of the temperature of the exhaust outlet gas from said engine, and motor means operable in response to changes in said first and second signals for moving the turbine speed varying member so as to regulate the turbine speed and thereby the rate of fuel flow to said engine in accordance with said air inlet and said exhaust gas outlet temperatures.

References Cited in the file of this patent

UNITED STATES PATENTS

| | | |
|---|---|---|
| 1,014,330 | Reeve | Jan. 9, 1912 |
| 1,815,097 | Davidson | July 21, 1931 |
| 2,487,842 | Whiteman et al. | Nov. 15, 1949 |
| 2,499,232 | Strub | Feb. 28, 1950 |
| 2,540,594 | Price | Feb. 6, 1951 |
| 2,550,678 | Deacon | May 1, 1951 |
| 2,551,229 | Alford et al. | May 1, 1951 |
| 2,610,464 | Knoll | Sept. 16, 1952 |